US005944928A

United States Patent [19]

Seidner

[11] Patent Number: 5,944,928

[45] Date of Patent: Aug. 31, 1999

[54] METHOD FOR MAKING COMPOSITE PANELS AND ENGINEERED MOULDINGS

[76] Inventor: Marc A. Seidner, 234 Conway Ave., Los Angeles, Calif. 90024

[21] Appl. No.: 08/818,764

[22] Filed: Mar. 14, 1997

Related U.S. Application Data

[63] Continuation-in-part of application No. 08/718,100, Sep. 18, 1996.

[51] Int. Cl.[6] .......... B32B 31/00

[52] U.S. Cl. .......... 156/160; 156/257; 156/259; 156/267; 156/268; 156/293; 156/298; 156/299; 156/300; 144/346; 144/350; 144/355

[58] Field of Search .......... 156/160, 229, 156/257, 267, 268, 293, 299, 300, 298, 259; 144/344, 345, 346, 350, 355, 349

[56] References Cited

U.S. PATENT DOCUMENTS

| | | | |
|---|---|---|---|
| 3,477,485 | 11/1969 | Talbott | 156/268 |
| 4,111,247 | 9/1978 | Hasenwinkle | 144/316 |
| 4,643,237 | 2/1987 | Rosa | 144/369 |
| 4,687,529 | 8/1987 | Wang | 156/163 |
| 5,665,190 | 9/1997 | Sansano Sanz | 156/154 |

FOREIGN PATENT DOCUMENTS

| | | |
|---|---|---|
| 605065 | 5/1926 | France . |
| 1295269 | 10/1962 | France . |
| 2624781 | 6/1989 | France . |
| 175877 | 10/1906 | Germany . |
| 4204675 | 8/1993 | Germany . |
| 607213 | 8/1948 | United Kingdom . |

OTHER PUBLICATIONS

Working in Wood, Library of Congress, Card 80–81148 ISBN 0–399–12550–7, pp. 238–239, 1980.

European Search Report, Publication No. WO 98/41371, Sep. 24, 1998.

PCT Written Opinion dated Dec. 18, 1998.

*Primary Examiner*—David A. Simmons
*Assistant Examiner*—Linda L Gray
*Attorney, Agent, or Firm*—Pretty, Schroeder & Poplawski

[57] ABSTRACT

A method of fabrication with the formation of a receiving panel which defines a plurality of spaced-apart parallel plows extending longitudinally. The panel has an open surface along which the plows are exposed and an opposing surface from which the plows are not accessible. The plows may be formed by adhering substrates to a separate veneer layer to define the plows between the substrates. It is preferable that the veneer layer be formed of wood, but the substrates can be formed of a less expensive material, such as composite material. Once the receiving panel has been fabricated, it is bowed to form an arc about an axis parallel to the plows. This can be done by passing the panel, carried by a belt, between two rollers that are configured to define between them a profile corresponding to the arc of the panel. While the panel is in this bowed condition, strips, made of wood, are inserted in the plows. The strips can be formed by opposing laminations that are not adhered to each other. An adhesive is applied to an interface between the strips and the surfaces of the plows and edge strips. The panel is then caused to return to an unbowed condition. The composite panel can be cut through the strips to form a plurality of segments that can be used as engineered mouldings. Cutting can be done by passing the composite panel through a rip saw having a plurality of parallel blades.

29 Claims, 7 Drawing Sheets

FIG. 1
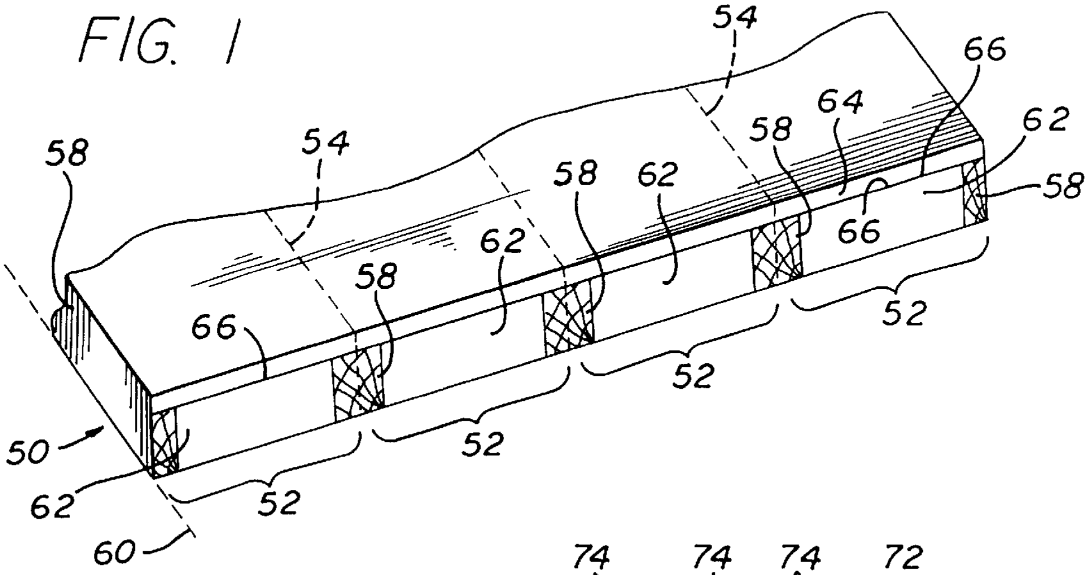
FIG. 3
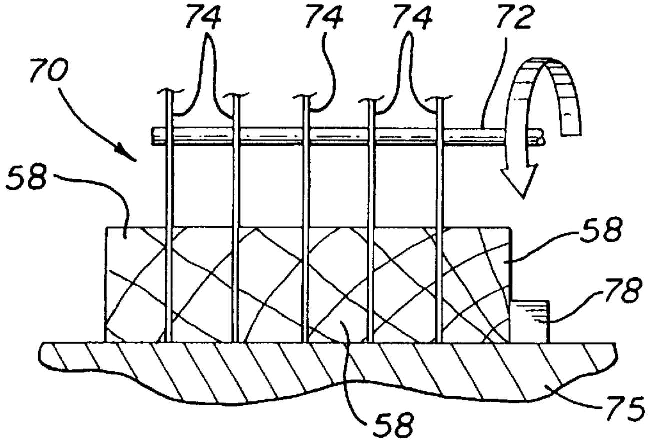
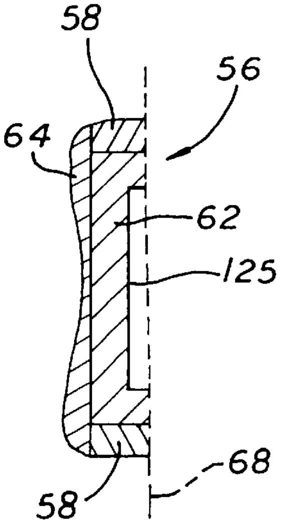
FIG. 2
FIG. 4
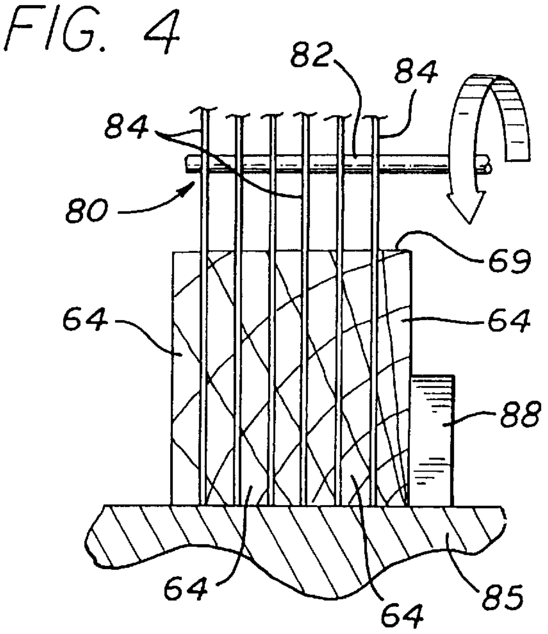

90
92
94
96
98
100
102
50
56
104
106
108
109
110
112
141a
141b
143a
143b
6
7

METHOD FOR MAKING COMPOSITE PANELS AND ENGINEERED MOULDINGS

RELATED APPLICATION

This is a continuation-in-part of application Ser. No. 08/718,100 entitled ENGINEERED MOULDING AND METHOD AND APPARATUS FOR MACHINING THE ENGINEERED MOULDING, filed on Sep. 18, 1996.

BACKGROUND OF THE INVENTION

The present invention relates to the fabrication of composite panels and mouldings, and more particularly to the fabrication of panels and mouldings formed by a combination of selected dissimilar materials.

The use of mouldings and other linear millwork such as base (floorboard skirting), flat and split door jambs, crown (ceiling surrounds), rabbeted jambs (frames), brick mould, and casings (door and window surrounds), is well known. Mouldings generally provide architectural detail and are decorative. Some mouldings also support light loads, such as door jambs on which door hinges are mounted. It is important that the exposed wood used in the mouldings be of a quality compatible with the desired finish, and with any load supported. For example, if mouldings are to be left in a natural or varnished state, the wood usually should be clear and bright, free of knots, fungus stains, pitch, wood discolorations, other visible blemishes and glued joints. Such mouldings are known in the construction industry as "solid clear grade lineal mouldings," or simply "solid clear mouldings."

Mouldings intended to be painted (or otherwise covered to hide glue joints, color, grain or defects in the wood) are known as "paint grade mouldings." Paint grade mouldings are used in most applications. The ability to use a lower grade knotty, defective, discolored, or otherwise imperfect wood in the fabrication of paint grade mouldings is important, considering that higher quality clear and bright grade woods are generally less plentiful and more expensive. The finger joint manufacturing process involved in the fabrication of paint grade mouldings removes defects that are not hidden by paint in finished mouldings. In recent years, the use of clear solid grade mouldings has declined, while the use of paint grade mouldings has become more common.

Finger joint moulding is produced using a fifty year old process. It is a complex multi-step process that includes: 1) ripping strips from a thick plank of wood; 2) cross cutting blocks of paintable and finger-jointable defect-free segments out of each strip by removing those segments having knots, splits, blemishes, or other defects; 3) reripping the cut blocks strips where required to a narrower width to remove any broken or wane edges; 4) finger jointing by machining and glueing the resulting accumulated clear blocks to form finger joint blanks of the desired length and dimension; 5) if necessary, resawing with a band saw or rip saw the finger joint blanks in a desired dimension or beveled shape; 6) passing the resulting blank through a multi-headed profiled knife moulder in lineal fashion to form mouldings in their final contoured cross-sectional shape; and 7) precision trimming and dado processing the moulding into the final desired length. Typical remaining steps for finger joint moulding processing, before shipping, may include sanding or patching, priming or painting, and packaging.

Though finger joint moulding is a widely accepted and used paint grade moulding, there are several undesirable characteristics associated with this manufacturing technique. First, the production of finger joint mouldings is slow, labor intensive, and generates a lot of wood waste. Even with skilled craftsmen and modem machines, approximately 45 to 50 percent of the original wood volume used is lost during the many processing stages (as sawdust, shavings, and defect blocks). The entire board footage volume of finished finger joint moulding profiles fabricated requires an equivalent volume of high quality clear solid wood after processing. The lumber materials used in the fabrication of finger joint moulding are expensive and of limited availability. If the process exposes a defect previously hidden inside the wood and it becomes apparent that a section or block is defective in that manner after it is fabricated into a blank, the entire blank may be deemed defective and subject to complete remanufacture.

Each discrete section of wood or blank used in finger joint moulding is composed of multiple smaller blocks or discrete wood sections. Therefore, each wood section is susceptible to its own natural characteristic tendencies of warping, splitting, bowing, cupping, twisting, and other such problems. Wood moulding that warps, cracks, or otherwise distorts is difficult and frustrating to work with, and increases scrap.

Another undesirable characteristic of prior art finger joint mouldings, shared with other paint grade mouldings and varnish grade mouldings, is that each moulding piece usually has to be fabricated separately. Rarely are more than two pieces machined simultaneously in one moulding machine, and two pieces may be machined simultaneously only when the profile has a very small cross-sectional dimension as most moulders are not wider than eight inches, twelve inches at the most. Machining one piece at a time is costly in both machine time and labor. Such processing adds significantly to the expense of the moulding and usually results in smaller mouldings being only slightly less costly than mouldings having larger cross sections, or solid clear grade lineal mouldings formed from higher quality wood. Since each moulding piece is moulded separately and since cross cutting is a separate operation, each piece also has to be handled, measured and cross cut by itself.

Other mouldings are formed as substrates that have veneers covering some or all of their surfaces. Veneers are common in mouldings used in furniture component construction. In prior art veneer mouldings, an inexpensive substrate of wood, or other material such as medium density fiberboard, is machined or formed in a quality fashion to the desired shape of the final moulding. A thin strip of separate veneer material (usually cut or sliced from a high quality wood) is then bent or contoured in a shape that conforms to the surface of the substrate. The veneer is adhered to the exposed surfaces of the substrate. If made correctly, veneer mouldings can have an attractive appearance resembling, but being less costly than solid clear wood mouldings. Veneer moulding is, however, more expensive than finger joint paint grade moulding. The use of veneer mouldings is usually reserved for low volumes of high quality, expensive hardwood species of which solid wood is too costly or difficult to obtain.

The prior art veneer mouldings have important shortcomings. To form a thin veneer into certain standard commercial profiles of desired angles or shapes, the veneer has to be bent sharply to conform to the contours of the profile. Most veneers are formed from a wood that cannot adapt to very sharp bending, and attempting to bend too sharply causes cracking. Although most cracking occurs in manufacturing, such cracking may occur after the moulding leaves the factory, perhaps during installation of the moulding. Sharp angles are, therefore, not usually found on veneered mouldings. In addition, the adhesive used to attach the veneer to the substrate may fail, allowing the veneer to peel away. Furthermore, veneer mouldings are expensive, requiring a careful machining of the substrate in a linear fashion before the application of the veneer, which is also accomplished in a linear fashion. The costs associated with acquiring veneers and is attaching them are relatively high. Veneer mouldings often have a better appearance than solid or finger joint wood, but are nevertheless often equated with either lower valued case good products or furniture, cabinets, and picture frames.

The machinery that is necessary and used to produce mouldings is an important consideration. Moulding machines that are commonly used to shape contoured lineal surfaces of mouldings are rarely capable of producing a moulding or process a blank that is as much as one foot or more in width. These machines are relied upon largely because they can provide cuts having extremely close tolerances and/or complex curves. If mouldings are milled by machines that cannot operate within these tolerances, certain edges of the work piece may be misshaped, the exposed wood of the mouldings may have raised or torn grains, or the lineal surfaces may have washboard effects. Further machining, or occasional sanding, is necessary to smooth the surfaces of work pieces having such washboard effects. Many times it is impossible to repair the surface and the entire product must be scrapped. Other prior art machines do not produce mouldings that are as attractive as mouldings made on moulding machines. These machines also require complex engineering and tooling. They are individually built by hand and require precise tolerances in the machine and tool steel used. They are, therefore, relatively expensive to purchase. Operating these moulding machines requires a high degree of skill and maintenance is expensive and technically burdensome.

Another type of machine used in the conventional fabrication of mouldings is the planer or matcher. These machines are used primarily to plane or smooth the outer surface of lumber or a blank in a lineal manner. It is generally impossible to cut through a piece of wood to form multiple separate lineal mouldings from a single piece of wood using a planer. Although planers are less expensive to buy and operate than moulders that have similar board footage throughput capabilities, they can perform only a limited function.

Rip saws are also used in moulding fabrication to make cuts that extend lineally through pieces of wood. Rip saw cuts do not necessarily generate much wood waste. However, forming curved or contoured lineal surfaces using rip saws is generally not possible, because rip saws do not control the width, depth and straightness of a cut to the degree necessary.

It should thus be evident that moulders, planers, and rip saws each have their own purposes in moulding fabrication. Each piece of prior art machinery works on very few pieces at any one time in a lineal fashion. Additionally, to form many mouldings, there are multiple necessary processing steps that often require different machines.

In certain prior art processes, where work pieces that have edge-glued panels or laminated substrate panels machined into a panel or moulding having finished contoured edges or surfaces, the product is produced by machining, using routers as cutting tools which move about the work piece while maintaining the work piece in a fixed location and position. An example of a machine that cuts in this manner is a computerized numerical control routing machine. Such routers are usually limited to a maximum of four or five routing heads that work simultaneously on one work piece. Moreover, computerized numerical control systems are complex to program, expensive to purchase, and typically machine large surface areas relatively slowly. In general, they are not a practical alternative to moulding machines.

The greatest volume of mouldings sold is of standardized profile shapes and sizes that have simple but well defined contoured cross-sections. These mouldings with rectangular profiles, rounded edges, simple "S" faces, ogee faces or edges, and radius curved cross-sections represent approximately 85 percent of all mouldings sold. Intricately curved and angled mouldings and very complex profiles traditionally represent approximately only about 15 percent of moulding volume. Many prior art machines used to produce mouldings are, therefore, more complex, and can provide profiles of much more intricate architectural detail and variations in design than is necessary for the predominant volume of mouldings made and consumed by the housing, furniture and commercial construction industries.

Reducing the costs of machinery, labor, and the bulk of the raw material consumed in moulding production, and yet providing a technique for producing mouldings formed from multiple wood sections with a high quality appearance, is most desirable. Limiting the percentage of high quality wood contained within such mouldings, and the waste associated with producing such mouldings, is also highly desirable. Replacing such high quality woods with lower quality woods, wood substitutes, or other materials is desirable where such replacement does not detract from the appearance sought or the properties necessary for use of the mouldings. Production of a veneered moulding that appears as if it were solid wood and permits the machining of sharp cross sectional curves and angles on the contoured profile is also desirable. It is desirable to provide a fabrication process that is not extremely complex to carry out and is of lower cost than using a conventional moulder, which can inexpensively mill the wood into high quality mouldings with close cross sectional tolerances and do so in volume. It is further desirable to provide a moulding fabrication process that is not more labor intensive than has customarily been necessary. The present invention can satisfy these desires, using relatively uncomplicated technology.

SUMMARY OF THE INVENTION

The present invention relates to an improved method of fabricating composite panels and engineered mouldings formed from those panels. The methods start with the formation of a receiving panel which defines a plurality of spaced-apart, parallel plows extending longitudinally along the panel, thus defining substrates between the plows. The receiving panel has an open surface along which the plows are exposed and an opposing surface on which the plows are not accessible. The receiving panel may be formed from a single piece of wood, the plows being created by removing material and leaving a continuous veneer layer extending across the entire panel and connecting the substrates. Alternatively, the plows may be formed by adhering the substrates to a separate planar veneer layer so as to define plows between the substrates. In this case, it is often preferable that the veneer layer be formed of wood, but the substrates can be formed of a different and less expensive composite material, such as particle board, medium density fiberboard, oriented strand board, laminated veneer lumber, plywood, cement board or rigid plastic foam.

It should be understood that the use herein of the term "veneer layer" does not in all cases refer to a separately formed layer. The veneer layer may be integral with the substrates.

Once the receiving panel has been fabricated, it is bowed to form an arc about an axis parallel to the plows. This can be done advantageously by passing the receiving panel, which is carried by a belt, between two rollers that are configured to define between them a profile corresponding to the desired arc of the panel. The width of the plows measured along the open surface is thus increased. While the receiving panel is in this bowed condition, strips, preferably made of wood, are readily and easily inserted in the plows, after an adhesive is applied to an interface between the strips and the surfaces of the plows.

The receiving panel is then caused to return to an unbowed condition, which may be accomplished by simply removing the forces which caused it to assume a bowed condition. The strips are thus secured within the plows, forming a composite panel. The composite panel is then cut through the edge strips to form a plurality of engineered mouldings or other elongated millwork segments. Cutting can be done by passing the composite panel through a rip saw having a plurality of parallel blades and cutting knives built to act on the panel in the way that a moulder acts on and wood blanks.

After the composite panel has been formed, but preferably before it is cut, it may be desirable to remove a portion or all of the veneer layer by machine sanding, planing or otherwise machining. If the veneer layer is to be removed, it may advantageously be formed of paper and may be replaced by a wood layer later in the process. A second veneer layer, preferably made of wood, paper, plastic or other such material, may be added to the composite panel by adhering it to the open surface of the receiving panel and the edge strips. This can be done regardless of whether the first veneer layer is removed.

Each edge strip may, if desired, be formed by two abutting laminations that are not adhered to each other, but are adhered to surfaces of the plow in which they are inserted.

BRIEF DESCRIPTION OF THE DRAWINGS

FIG. 1 is perspective view of one embodiment of an axially extending composite panel form, used to form one type of arc;

FIG. 2 is an end view of one embodiment of an engineered moulding that can be produced from the composite panel of FIG. 1;

FIG. 3 is a partial cross-sectional end view, illustrating the formation of the edge strips that are applied to the composite panel of FIG. 1;

FIG. 4 is a partial cross-sectional end view, illustrating the fabrication of machinable veneer that are applied to the composite panel of FIG. 1;

DETAILED DESCRIPTION OF THE PRESENT INVENTION

Figures 5A, 5B:
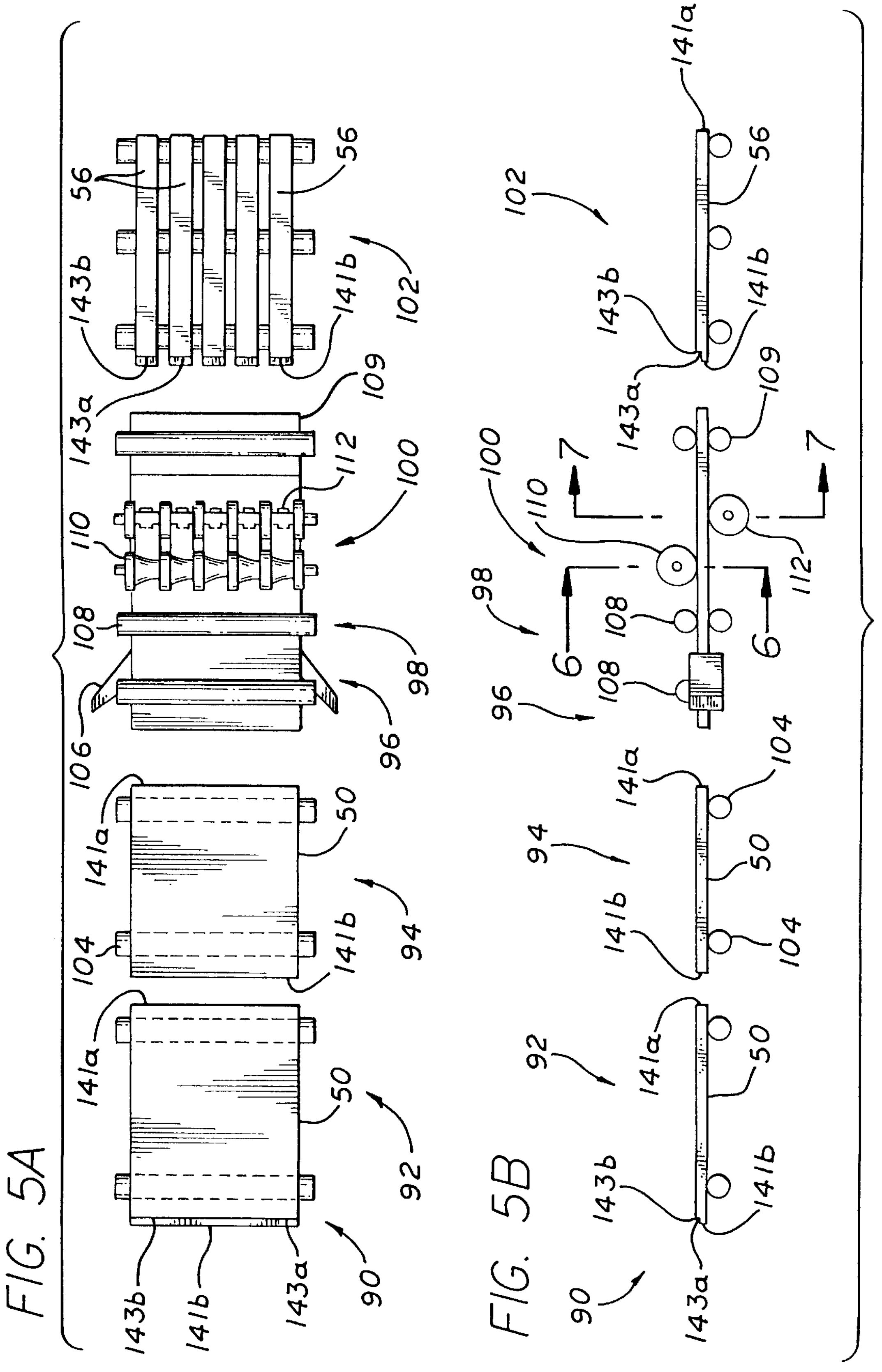
FIG. 5A is a top plan view, illustrating the cutting apparatus that forms engineered moulding from the composite panel form of FIG. 1.
FIG. 5B is an elevational side view of the cutting apparatus of FIG. 5A.

In this description, elements of different embodiments having similar structures that function similarly may be provided with the same reference number. All measurements and materials are for illustrative purposes only, and are not intended to be limiting as to the scope of the invention.

COMPOSITION PANEL FORM

An axially extending composite panel 50, illustrated in FIG. 1, is formed of solid wood and/or finger joint wood elements, or rotary or sliced veneer formed into a panel, and a wood or engineered wood substrate, or a composite wood substrate formed of other man made materials. The composite panel form is later cut along one or more cut lines 54 to form an assembled plurality of engineered blanks 52 that can be further machined to form a completed engineered moulding 56, as illustrated in FIG. 2. Cutting along the lines 54 can occur simultaneously with the forming of the contoured surfaces in the preferred embodiment, as described below. The axially extending composite panel 50 is generally oriented in an axial direction 60 that is parallel to the direction in which he composite panel is to be cut.

The composite panel 50 is fabricated from axially extending edge strips 58, a plurality of axially elongated substrates or cores (hereinafter called “substrates”) 62, and a machinable veneer layer (hereinafter called “machinable veneer” or “veneer”) 64. The machinable veneer may be formed from sliced or rotary veneer, but the preferred construction is a high grade wood finger joint blank, planed, and sliced thinly or resawed into thin flat blanks of a selected dimension and thickness and edge glued to form the panel.

The composite panels are generally more than one foot wide, and may be as wide as five feet. The desired configuration of the composite panels 50 depends largely upon the final intended shape of the engineered moulding being produced, and the angles from which it is likely to be visible when mounted.

The machinable veneers of the panels 50 are thick enough to allow contouring to a desired depth while avoiding cutting into the substrate. The machinable veneers themselves are machined similarly to, and have machining characteristics similar to the wood of a conventional finger jointed blank. The axially extending edge strips 58 are interspaced with, and adhere to, the substrates using a glue or resin. The longitudinal axis of the axially extending edge strip is parallel to the axis of the substrates, and both axes are oriented in the longitudinal direction 60. A substantially planer upper surface 66 is formed from the axially extending edge strips 58 and the substrates 62. The machinable veneer 64 is bonded with a glue or resin to the upper substrate surface 66, so that the veneer overlays nearly all of the axially extending strips 58 and substrates 62. The veneer may be formed as a single piece, or more likely as a plurality of parallel pieces butted in an edge-to-edge configuration, depending upon the size of the composite panel, and the dimensions of the available lumber.

Part of the substrate contacts a surface 68, such as a wall, floor, etc. (See FIG. 2) when the engineered moulding is mounted. If desired in the profiled shape, or if customary in the trade profiles, a back out or recess 125 is formed in the back side of the substrate. The back out is similar to that in conventional mouldings, providing a stress-reduction configuration and a location for loose pieces of wall board, tape, etc. that would otherwise interfere with mounting the moulding flush relative to the mounting surface 68.

The three elements of the engineered blank 52 that are visible in the mounted final engineered moulding 56 (secured to a wall, etc.) are the edge strips 58, the machinable veneer 64, and the end boards 63 if used. These elements may be viewed as forming a channel in which each substrate 62 is located. The wood forming the channel is machined, or contoured, by a reengineered rip saw to form any visible contouring in the finished and mounted mouldings. The substrates 62 are not formed from the same material as the machinable veneer, but rather from a material selected for its structural characteristics and low cost, not its appearance. Preferred characteristics of the substrate include being less expensive, more readily available, structurally stronger, more resistant to distortion or warping, and other sometimes desired characteristic such as enhanced fire retardation, compared with the wood of the machinable veneer or the edge strips. Alternately, depending upon the application of the moulding, the substrate may be formed to be extremely light or very dense, and may or may not be structural. The substrate should be selected for its functionality, including such traits as stability, consistency, weight, ease of machinability, availability and low cost. Such materials as lumber core, particle board, laminated veneer lumber (L.V.L.), medium density fiberboard (M.D.F.), hardboard, composite mineral core board, oriented strand board (O.S.B.), cement board or plywood are satisfactory substrates. The substrates may even be formed from other materials such as plastics, firm or rigid foam (polystyrenes, expanded PVCs, and other types) reconstituted recycled materials, or a combinations of these materials. The substrate 62 is typically not visible when the engineered moulding is secured in position.

Multiple engineered blanks 52 (or the associated engineered mouldings 56) can be simultaneously formed from a single wide composite panel 50. In addition, much of the contouring and profiling of each of the engineered blanks 52 into desired engineered mouldings 56 can occur simultaneously, as well. This application of simultaneous processing, or parallelism in machining moulding elements, represents a major improvement. These advantages become apparent when considering that the cost and use of moulders represent a major expense in moulding mills and that considerable machine time is required to fabricate each length of finger joint moulding.

A reengineered rip saw, described below, can perform this simultaneous cutting, contouring, and profiling. Rip saws are designed to cut generally parallel to the wood grains as the work piece passes through the machine-driven rotating saw. Lineal mouldings produced in any manner are cut in a direction parallel to the wood grains. In this process, the cutting knife is turned in one direction concentrically while cutting into the workpiece, which is moved against the direction of the cutting knife. Therefore, it is important that the wood of the axially extending edge strips 58 and the machinable veneer 64 are both arranged such that their grains are parallel to the axial direction 60 of the composite panel 50. In this manner, the rip saw (designed to cut parallel to the wood grain) can be adapted and reengineered to perform a moulding function that will effectively shape the composite panel form instead of shredding the edges of the wood as occurs when the rip saw cuts into the grain of the wood. It is also possible that a standard rip saw can more efficiently and accurately cut the axially extending composite panel form 50 into multiple engineered blanks 52 of the same size, or varying sizes, and then a moulder is used to machine each particular dimension of engineered blank 52 into engineered mouldings 56 in a similar manner.

Edge strips 58, shown in FIGS. 3 and 4, are integrated into the composite panel 50 of FIG. 1. It is preferable to use clear solid grade lineal blanks or finger joint blanks. As described above, the manner in which the finger joint blanks are cut and combined to form the composite panel form of the present invention may be varied as desired. A finger joint blank 69 is cut by a rip saw 70 that includes an arbor 72 and a plurality of rip saw blades 74 (the rip saw blades above the arbor are broken off in FIGS. 3 and 4 for ease of illustration). The arbor 72 rotates about its axis. Each rip saw blade 74 is spaced from adjacent blades by a distance corresponding to a final desired dimension of the edge strip, allowing for the dimension required for the cut. A guide member 78 guides the finger joint blank in a prescribed direction within the horizontal plane during the cutting process, and roller hold down guides (not shown) provide straight tracking of the finger joint blank. The edge strips are cut to a suitable thickness whereby all of the desired machining steps may be accomplished on each edge of the engineered moulding 56. This machining includes cutting the edge strip approximately in half when the axially extending composite panel form 50 is cut into multiple engineered mouldings. The edge strips should be thick enough so that the portion of the strip that remains after cutting through a vertical plane can concurrently be shaped to form the desired final contour of the engineered moulding. The profile will usually be machined first with the splitting or separation machining done last.

FIG. 4 illustrates one embodiment of the formation of the machinable veneers 64 that are integrated into the composite panel 50 of FIG. 1. A fingerjoint blank, of the type referred to above as 69 (see FIG. 4), is cut by a rip saw 80 that includes an arbor 82 and a plurality of rip saw blades 84. Each rip saw blade 84 is spaced from an adjacent blade by a distance corresponding to maximum final desired thickness of the machinable veneer. Alternatively, a multiple sawjig type veneer saw may be used. The machinable veneers are formed from a single piece of solid lumber or a finger joint blank 69. A guide 88 for straight cutting is attached to a table 85 to guide the finger joint blank in a prescribed direction within a horizontal plane as it is being cut together with certain roller hold-downs and guides (not shown). The veneer strips 64 and edge strips 58 are cut to a suitable dimension whereby all of the desired machining steps may be accomplished on each edge of the engineered moulding 56. This machining includes the cutting of the edge strip 58 approximately in half. Alternatively, monolithic rotary peeled veneers of the type that are not further shaped may be used where the outer shape of the surface of the machinable veneers facing away from the substrate, that are attached to the substrate, are of the intended final shape when they are attached to the substrate. High grade thin M.D.F. may also be used as a composite veneer substitute in those instances where the appearance of the M.D.F. is satisfactory for the specific application.

The engineered blank of the present invention includes a substrate that is preferably of uniform thickness, density and material consistency. The substrate may be, for example, O.S.B., M.D.F., particle board, firm foam, or another material formed from compressed and bonded wood fiber overlaid in alternating directions or engineered in a unidirectional pattern. These materials are not as susceptible to warping, twisting, cupping, bowing, and splitting as solid wood. O.S.B., particle board, and M.D.F. and are largely formed from less costly wood fiber strands, chips, and wood wastes. They are much less expensive than a comparable sized solid wood finger joint blank. O.S.B. also has a particularly high tensile strength and exterior resin that makes it desirable for many structural and exterior applications. In this manner, a material that is quite inexpensive can be used to provide a superior structurally sound and reliable finished product. It is also possible to use plywood, rigid plastic foam and other such materials The material for the substrate can be selected based upon the particular application of the final engineered moulding.

REENGINEERED RIP SAW

The production of an embodiment of the composite panels 50 has been described. A reengineered rip saw or saw apparatus 90, shown in FIGS. 5A and 5B, converts each composite panel into a plurality of engineered blanks or engineered mouldings 56. The reengineered rip saw 90 includes an arbor holding a number of moulder heads that cut the composite panel into a variety of engineered mouldings depending upon certain prescribed dimensions of the cutting tools. These prescribed dimensions depend upon such parameters as the number of moulder heads, number of knives, number of cutter elements, size of saws, number of engineered mouldings formed from each composite panel form, horsepower, RPM of the cutters, linear feed speeds of the component panel forms, etc. The prescribed dimensions are design choices that further depend upon such considerations as the type of wood and substrate used in the formed moulding the size of the moulding, and similar factors. These specifics are not detailed here, but conventional formulas and techniques applied to standard moulding machine applications may be applied, and are within the normal working knowledge of saw designers.

The reengineered rip saw may also be applied to cut, mould, and contour multiple lineal pieces of the same size and profile or a variety of sizes and profiles of parallel mouldings from a wide engineered finger joint and edge-glued blank. Normally, rip saws are much wider than 12-inches and are usually able to rip products from 24-inches to as much as 60-inches wide. Mouldings much wider than those which can be made on any other moulder can easily be made on a reengineered rip saw.

The reengineered rip saw 90, illustrated in top plan view in FIG. 5A and in side elevational view in FIG. 5B, includes an infeed supply section 92, a transport roller section 94, a guide section 96, a hold down and infeed section 98, a cutting section 100, and an exit section 102. The infeed supply section 92 contains composite panels 50 arranged so that one composite panel after another can automatically be fed into the transport roller section 94. The transport roller section 94 includes transport rollers 104 that continually rotate to feed the composite workpiece to the guide section and the hold down section.

The guide section 96 consists of measuring, indexing and line up apparatus as well as a plurality of spaced guides or fences 106 that deflect the composite panel 50 laterally, if necessary, into the correct position. The hold down and infeed section 98 includes upper hold down rollers 108 and lower hold down rollers or guides 109 positioned above and below the path of the composite panel 50, which securely contact each panel as it travels to the cutting section 100. The hold down rollers 108 are preferably motorized to drive the composite panel 50 through the cutting section. If lower hold down guides that do not rotate are used, they are generally contoured to the shape of the composite panel (such as including contours for rabbet joints or rabbet grooves). The use of hold downrollers and guides is well known in the wood working art. They can precisely position the composite panel 50 laterally relative to the reengineered rip saw. The use of fences, hold down rollers, and hold down guides improves tolerances of the engineered moulding 56 and provides consecutive panel tracking by respectively reducing waver and flutter of the composite panel 50 during cutting within the cutting section 100. Fences, hold down guides and hold down rollers may also be integrated into the cutting section 100 to further limit waver and flutter during the cutting process and to aid in the feed through aspects of moving the moulded lineal product through the reengineered rip saw. Precisely controlling the position of the composite panel 50 within the cutting section 100 ensures close tolerances of the engineered moulding. The exit section 102 removes the engineered blanks or the finished engineered mouldings 56 formed in the cutting section 100.

The cutting section 100 includes an upper cutter element 110 and a lower cutter element 112. Only one upper cutter element and one lower cutter element is needed for most profiles of household construction mouldings. If the desired engineered moulding 56 is especially complex or large, multiple upper cutter elements or multiple lower cutter elements may replace a single cutter element. Each cutter element then carries cutter heads that hold cutter knife blades. Since the upper cutter element is spaced along the cutting path from the lower cutter element, it is important that close tolerances be maintained so that the lower cutter element is accurately positioned relative to cuts already made to the engineered moulding from the upper cutter element. Although the laterally spaced fences 106, the hold down guides 109, and the hold down rollers 108 improve relative positioning between the upper and the lower cutter elements, some machines may additionally use a laser tracking and displacement section or preformed guides to ensure close conformation of the profiles being produced by each successive cutter element with the desired contour shape of the engineered blank, at that point. The laser tracking or preformed guides can align each successive cutter element with the cuts applied to the composite panel by previous cutter element(s). In laser tracking devices, which are increasingly used in the sawmill industry, a laser measures the alignment to a desired reference machined surface. If the machined surface from the upper cutter element is displaced from the current lateral position at which the lower cutter element is cutting, the operator is alerted to readjust the mechanical hold down guides and preformed alignment fences so that the lower cutter elements are displaced relative to the axial cuts previously made to the workpiece to provide the properly aligned cut.

Figure 6:
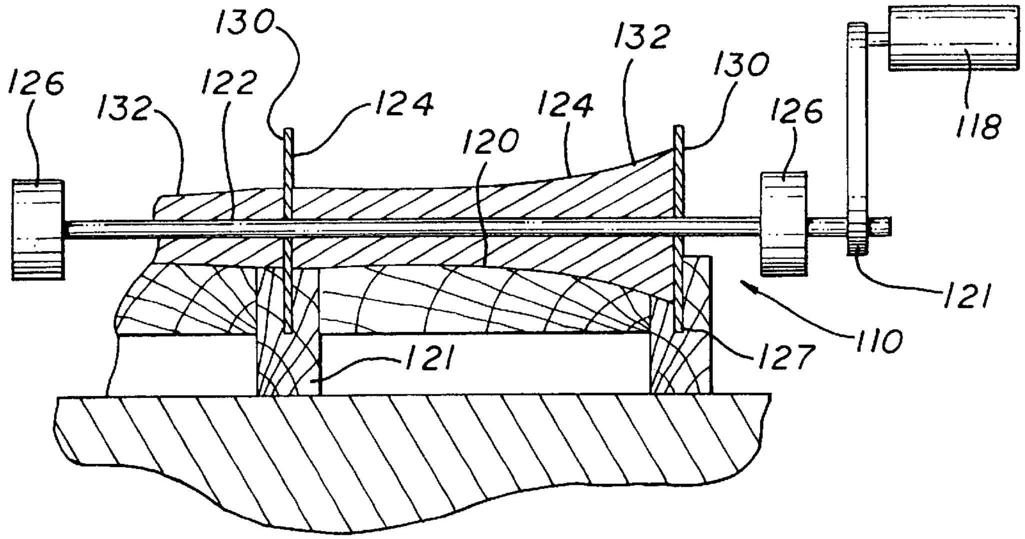
FIG. 6 is a cross-sectional elevational end view taken along section line 6—6 of FIG. 5B.
Figure 7:
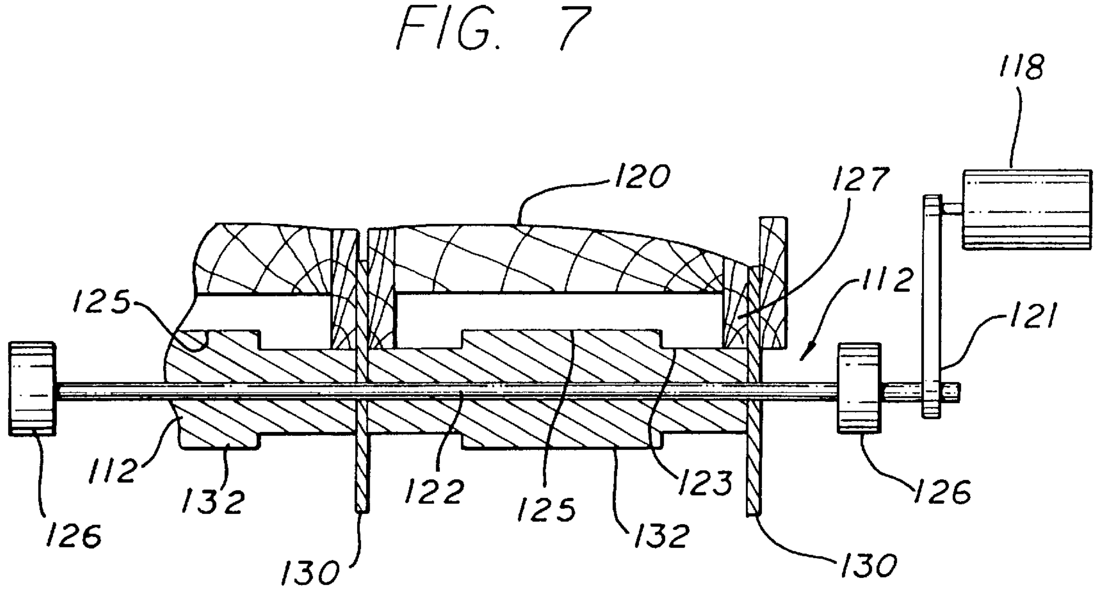
FIG. 7 is a cross-sectional elevational end view taken along section line 7—7 of FIG. 5B.

FIGS. 6 and 7 show how the contour of the upper cutter element and the lower cutter element combine to define the entire outline of the engineered moulding 56. In effect, the upper cutter element shapes the surface of an upper portion

120 of the engineered moulding (see FIG. 6). A bottom interconnection 121 of the composite moulding is still intact after the upper cutter element shapes the upper portion. The lower cutter element then shapes the surface of a lower portion 123 of the engineered moulding and cuts away the bottom interconnection, as shown in FIG. 7. Junction points 127 (FIG. 7) distinguish the surface formed primarily by the upper cutter element 110 from the surface formed primarily by the lower cutter element 112. The order of the cuts by the upper and lower cutting elements is generally irrelevant. It is important, though, that the latter cutter elements be properly laterally and vertically aligned with the cuts produced by the prior cutter elements. An up/down adjustment (not shown), more precisely geared for precision moulding, is provided to selectively move the arbor 122 up or down a prescribed and controllable distance. As the arbor moves up or down, so do the cutter elements, which control the combined depth of cut of all of the cutter elements on that arbor into the workpiece.

The upper cutter element 110 and the lower cutter element 112 are each preferably formed as a modified moulder cutter head to slide onto and attach to form a portion of the reengineered rip saw. In the past, rip saws have gained a reputation of being large tolerance, but inexpensive cutting devices. By comparison, moulders are close tolerance, but expensive cutting devices. While using moulders to form mouldings having complex curves may be desirable, the reengineered rip saw described here can be applied to mouldings with complex curves, mouldings with routine curves, and also to rectangular mouldings. The vast difference in cost between moulders and reengineered rip saws makes it advantageous to use reengineered rip saws to form mouldings whenever possible. The element of operating cost related to units of production of lineal moulding output for labor, power and tooling costs favor the use of the reengineered rip saw over the prior art moulders, band saws, and planers.

The elements of the upper cutter element 110 of the reengineered rip saw 90 will now be described. Similar structures and principles are used in both the upper cutter element 110 and the lower cutter element 112. The upper cutter element includes a motor 118, a drive mechanism 121, an up/down adjustable arbor 122, at least one cutting blade 124, and a plurality of bearings 126. The motor and drive mechanism are well known in the sawmill industry. However, the reengineered rip saw is configured to generally carry more and/or wider cutting heads containing cutting tools and blades on each cutter element than conventional ones, or multiple, straight saw blade through-cut rip saws. This is because many cutting tools and blade faces may be used to shape the engineered moulding 56 and also cut between adjacent engineered mouldings formed from the same composite panel form 50. The wider surface of cutting tools and blades of the cutter elements 110, 112 also demand a more powerful motor and drive arrangement, a larger and more adjustable arbor, and stronger more precise tolerance bearings 126 than prior art rip saws. Therefore, the horsepower of the motor preferably is increased, compared with conventional rip saws, to compensate for more, and wider cutting tools. Two or more arbors that carry some cutting tools and blades may have to be applied to provide the multiple cuts for out of the ordinary and more complex profile shapes required in the preferred embodiment. The cutting tools and blades are non-rotatably affixed to the arbor using hydrolocking self-centering cutting heads wherein the cutting tools and blades are contained. The reengineered rip saw can achieve closer tolerances than prior art rip saws used in industry due to the addition of heavier and more precise machine guides, hold downs, and tracking arrangements.

The composite panel 50 form may be relatively wide since multiples of engineered mouldings 56 are machined therefrom in a parallel manner, as illustrated in FIG. 1. It is preferable that the upper cutter element 110 and the lower cutter element 112 are both at least as wide as the composite panel 50 to provide a complete one-pass execution of the profile shape. The entire upper portion and the entire lower portion of each engineered moulding can thereby be formed from the same respective upper cutter element 110 and lower cutter element 112 pair. This consistency of circumference and concentricity of depth of cut of upper and lower cutter elements makes the cuts applied to the engineered mouldings more uniform and results in smooth moulder machine surface quality.

As illustrated in FIGS. 6 and 7, there are two distinct major types of cutting tools and blades: vertical cutting blades 130 and horizontal contour cutting blades 132. The function of the vertical cutting blades 130 is to cut at least a portion of one vertical edge of the final machined engineered moulding 56, as illustrated in FIG. 7. In the preferred embodiment vertical cutting blade 130 on the upper cutter element 110 has a mating vertical cutting blade on the lower cutter element 112. The vertical cutting blade 130 on the upper cutter element must cut downwardly to a level that is at least as low as the vertical cutting blade on the lower cutter element cuts up to (preferably there is some overlap between the levels that the lower and the upper cutter elements cut to). The mating vertical cutting blades of the upper cutting element and the lower cutter element therefor remove all interconnecting wood 135 between the adjacent engineered mouldings.

The horizontal contour cutting tools and blade 132 mounted on arbor 122, as shown in FIGS. 6 and 7, form the contoured surfaces of the engineered moulding that are not vertical edges 134. The horizontal contour cutting tool blades that are part of the upper cutter element 110 contour the upper portion 120 of the engineered moulding. The horizontal contour cutting tool blades that are part of the lower cutter element 112 contour a lower portion of the engineered moulding. Although FIGS. 6 and 7 show all of the vertical cutting blades 130 and all of the horizontal contour cutting blades 132 as being located on two cutter arbor elements, it is possible to provide a different number of cutter elements having different blade configurations, etc. Therefore, one reengineered rip saw is capable of performing the production of a variety of prior art moulders, rip saws, band saws, and planers that operate lineally to form mouldings.

One advantage of cutting a composite panel form 50 comprising a substrate 62 formed from particle board, O.S.B., M.D.F. (or another substrate that is not formed from discrete solid wood, or is formed from inferior core quality wood) is that there is less possibility that wood sections cut by vertical cutting blades 130 will move relatively, distort their shape, or warp during the cutting process. When a discrete wood section is cut, by comparison, the two cut portions tend to move or warp with respect to each other since there are considerable natural stresses present in discrete natural wood pieces. These stresses generally increase with the size of the discrete wood piece due to the grain directions or other natural characteristics of the wood. The overlaying of the non-discrete wood sections with the grain directions of the different overlays oriented in different directions tends to cancel these natural wood stresses. This movement of relative cut sections with respect to each other becomes a greater problem in the saw 90 of FIGS. 5A and 5B when cutting a composite panel formed from discrete solid wood instead of a composite panel including a non-discrete wood substrate. This is so because the multiple cutter elements 110, 112 of the cutting apparatus 90 do not cut simultaneously. It is more difficult for the latter cutter elements to align their cutting blades with the cut multiple sections from the upper cutter element when cutting discrete solid wood sections due to the stresses in the discrete wood sections as compared with substrates of the type described here, and the resultant relative motion between the cut wood sections as the product moves lineally through the reengineered rip saw. The natural tendency of solid wood to distort when partially or fully ripped or cut reduces the ability to align multiple cuts of top and bottom arbors as solid wood products cut in multiples of profiles in prior art systems.

Another advantage of using the reengineered rip saw as described below results from the multiple lineal lengths of moulding (referred to herein as "multiples") that are cut in parallel. If it is desired to cut many pieces of wood of the same length and having the same dado configurations, then the composite panels 50 can be precision end trimmed and/or dado trimmed before feeding the panel into the reengineered rip saw. Therefore, when the composite panels are cut into multiples using the reengineered rip saw, each resultant engineered moulding has the same dado cuts and/or precision end trim cuts. The ability to cut multiples from one composite panel having nearly identical precision end trim cuts or dado cuts is especially desirable when producing such high-volume, similar dimensional, and close tolerance items such as door jambs. The operator of the reengineered rip saw need only make the measurements for the cross cuts or the dado cuts once for all of the engineered mouldings formed from a single composite panel, providing that they are all intended to be cut to the same length. This compares with the prior art moulding and dado machines in which distinct measurements and continuous individual handling is required for each piece of moulding. The ability to accurately measure, cross cut, and dado cut panels which yield multiples simultaneously saves considerable operator time and the associated expenses. FIGS. 5A and 5B illustrate a variety of dado cuts and precision end trim cuts. For example, the leftmost composite panels 50 illustrated in FIGS. 5A and 5B, as well as the finished engineered mouldings 56, both have precision end trim cuts, on both ends, providing surfaces 141*a* and 141*b*, and a dado cut providing surfaces 143*a* and 143*b*. By comparison, the composite panel that is second from the left in FIGS. 5A and 5B has only the precision end cut surfaces 141*a* and 141*b*.

Figure 8:
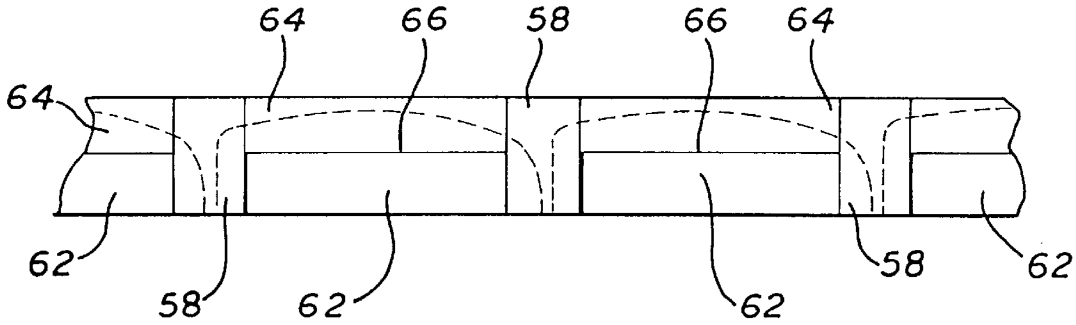
FIG. 8 is a cross-sectional end view of one embodiment of a composite panel illustrating cuts that define one embodiment of engineered moulding.
Figure 9:
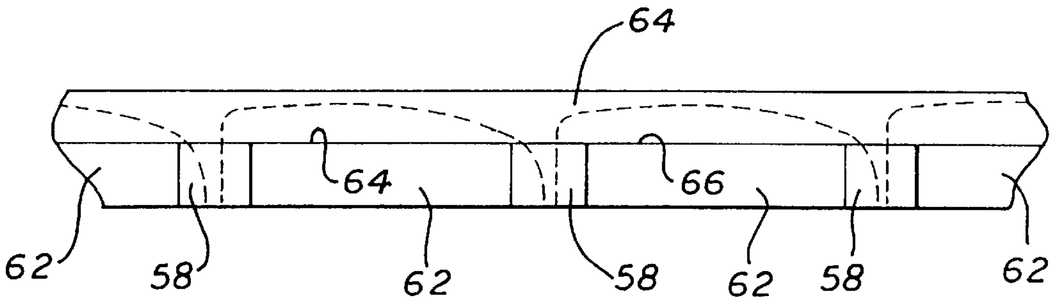
FIG. 9 is a cross-sectional end view of another composite panel form illustrating cuts that define another engineered moulding.

FIGS. 8 and 9 each illustrates a different composite panel, the edge strips and the machinable veneers of the composite panel form being arranged in different configurations. In FIG. 9, the machinable veneer 64 is continuous, although it may be formed from several elements, and extends along the entire upper surface of the composite panels 50. Both the substrate and the end boards alternatively contact a lower surface of the machinable veneer. In FIG. 8, by comparison, the lower surface of the machinable veneer only contacts the substrate, and the combined veneer/substrate alternates horizontally with the edge strips 58. Whether a FIGS. 8 or 9 composite panel configuration is preferred depends upon the specifics of the assembling and forming the composite panel, and is a design choice. The broken lines in FIGS. 8 and 9 illustrate an example of the final cuts that are provided by the reengineered rip saw to form the engineered mouldings.

METHOD OF FABRICATION

A highly efficient and labor-saving method for forming composite panels and dividing the panels into engineered mouldings will be described here. This method will be described, by way of example, with respect to the formation of relatively simple engineered mouldings of rectangular cross-section, but it will be understood that the same method is applicable to the wide variety of mouldings (and corresponding composite panels) as described above, including those having more complex profiles and requiring additional cutting steps.

Figure 10:
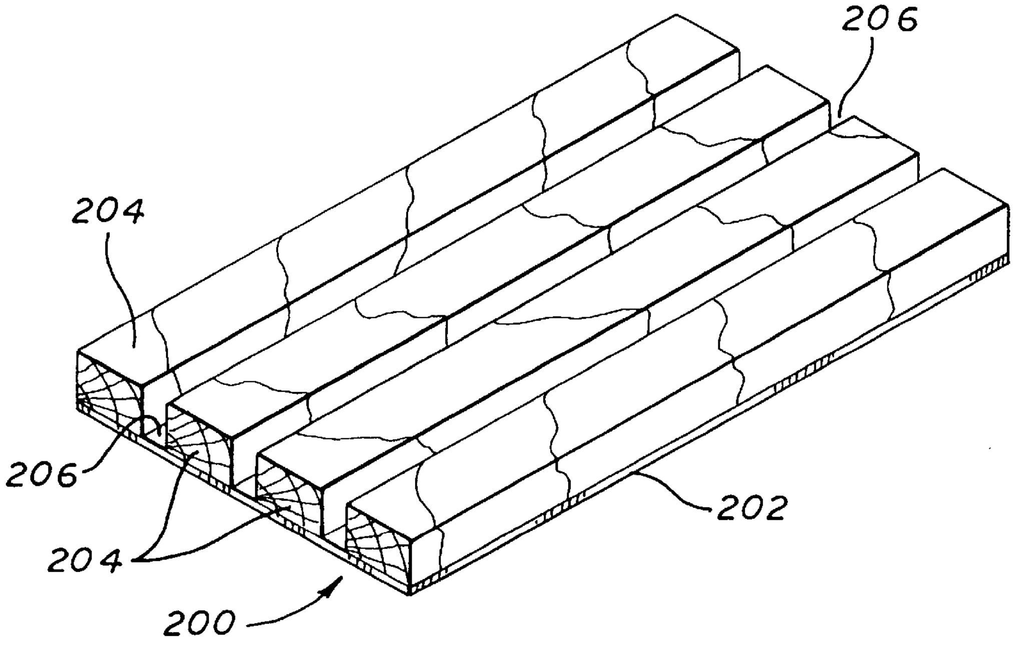
FIG. 10 is a perspective view of a receiving panel fabricated in accordance with the invention.

This method begins with the fabrication of a receiving panel 200, shown in FIG. 10. This panel 200 includes a thin veneer layer or sheet 202, which may be made of wood. This is not a "veneer" in the sense of prior art veneer mouldings. It is flat and planar and is not bent to conform to the shape of any other piece.

Figure 11:
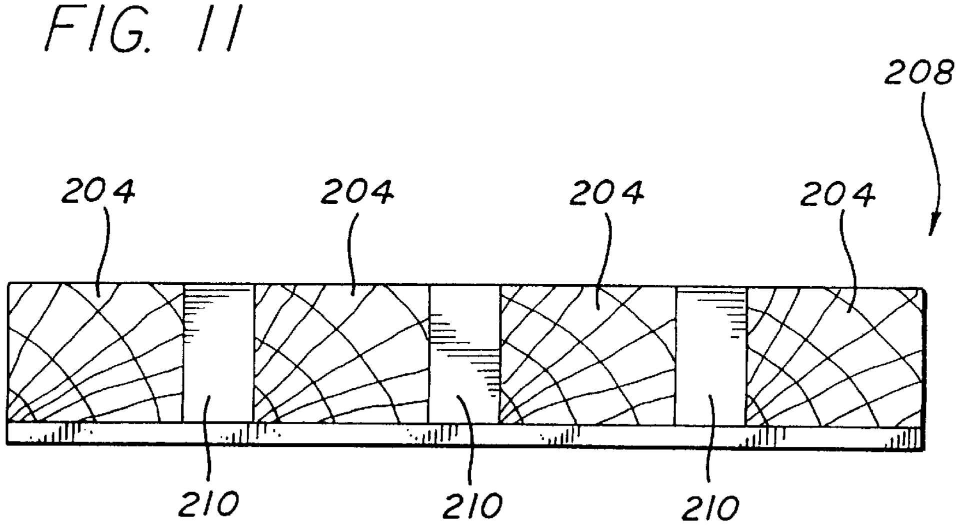
FIG. 11 is an end view of a composite panel fabricated in accordance with the invention.

A series of substrates 204 are adhered linearly to the veneer layer 202 so that the substrates, each of which is of rectangular cross section, is parallel, defining plows or troughs 206 between the substrates, the plows also being of rectangular cross section. The receiving panel 200 thus has an open surface on which the plows 206 are exposed (the top surface shown in FIG. 10) and an opposing surface on which the plows are not accessible. Typically, the width of the substrate 204 is greater than that of the plows 206. From the receiving panel 200, a composite panel 206, shown in FIG. 11, is formed by inserting edge strips 210, preferably made of wood, in the plows 206 between the substrates 204, to form a panel corresponding to the panels 50 of FIG. 1.

To accomplish the insertion of the edge strips 210 efficiently and to achieve a tight fit, the receiving panel 200 is placed on a flexible conveyor belt 212 which passes between a pair of opposing rollers 214 and 216. (FIG. 12) One roller 214 is wider in the middle and narrower at the ends, whereas the other roller 216 is narrower in the middle and wider at the ends. The rollers 214 and 216 are thus configured so as to define between them an arcuate opening 218 through which the belt 212 and receiving panel 200 pass. It should be noted that when the rollers 214 and 216 are rotated, there are differences in the linear speeds of the opposing surfaces of the rollers due to their curvature. For this reason it is necessary for the rollers 214 and 216 and the belt 212 to be of material having a relatively low coefficient of friction and permitting slippage.

Figure 12:
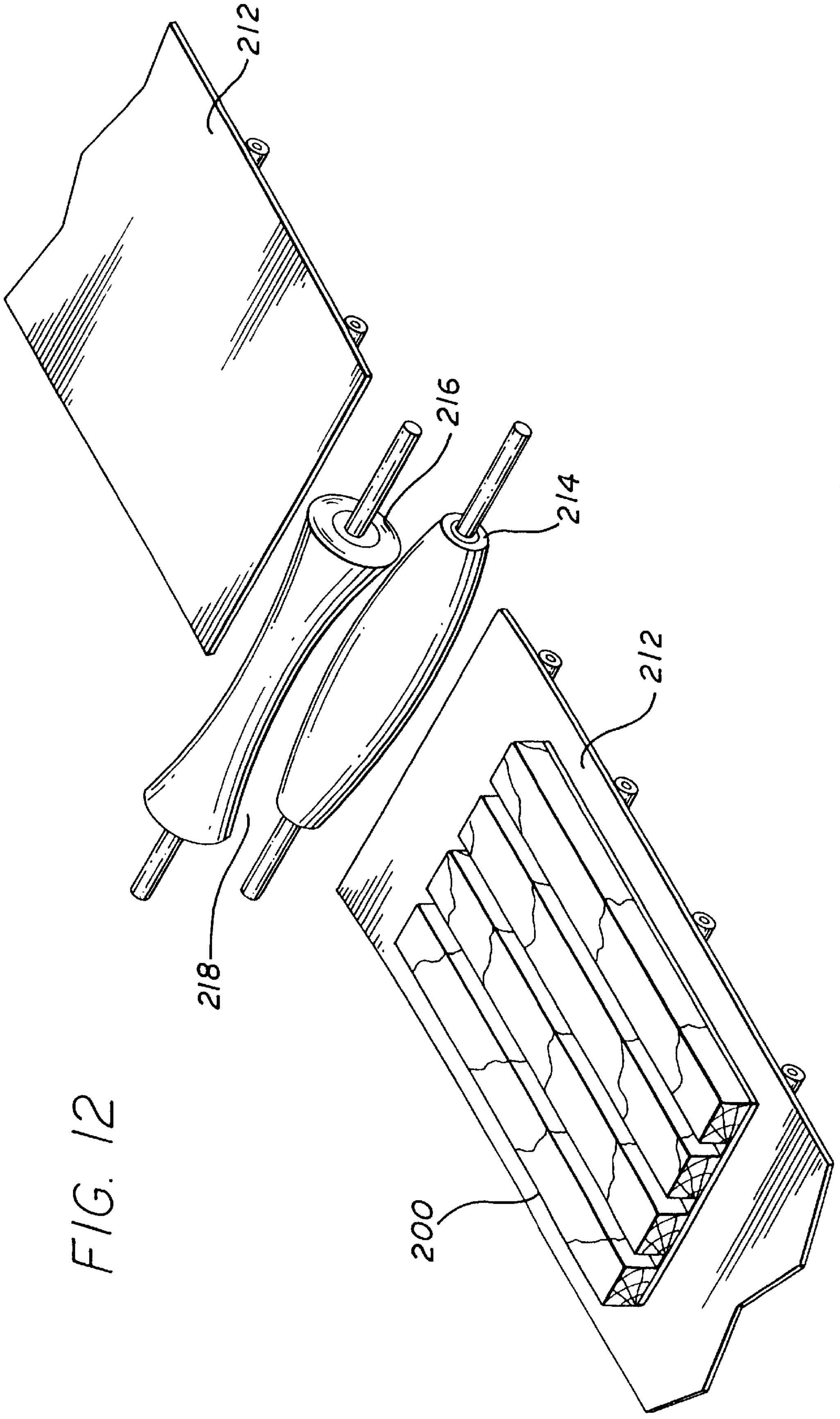
FIG. 12 is a pictorial view illustrating the manner in which the receiving panel is bowed.
Figure 13:
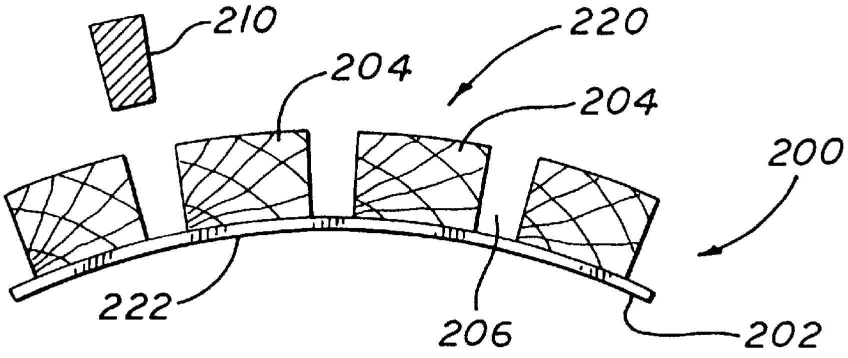
FIG. 13 is an end of a bowed receiving panel.

As the receiving panel 200 passes between the rollers 214 and 216, it is forced to assume a bowed configuration, as shown in FIG. 13, corresponding to the profile of the opening between the rollers 214 and 216. The open surface 220 of the receiving panel 200 on which plows 206 are exposed is then in tension, whereas the opposite surface 222, which is the surface of the veneer layer 202 on which the plows 206 are not accessible, is in compression. To accomplish this bowing of the receiving panel 200, it may be desirable to have a series of pairs of rollers 214 and 216 through which the receiving panel passes in succession, although only one pair of rollers is illustrated in FIG. 12.

With the receiving panel 200 in its bowed configuration, each plow 206 is forced to assume an open configuration in which it is wider at its open end than it is at its closed end, approximating a trapezoid. This configuration makes it much easier to insert the edge strips 210. Prior to inserting the edge strips 210, adhesive is applied to the surfaces of the plows 206 that will be in contact with the edge strips. Once the edge strips 210 are in place, the composite panel 108 thus formed is cause to assume its relaxed, unbowed configuration, as shown in FIG. 11. This can, in most cases, be accomplished by simply releasing the composite panel 208 from the constraining forces that have caused it to assume its bowed configuration.

Prior to the insertion of the edge strips 210, an adhesive is applied to the interface between the strips and the surfaces of the plows 206, particularly the surfaces of the substrates 204 that abut the surfaces of the strips 210. The adhesives can be applied either to the receiving panel 200 or to the strips 210. The insertion of the strips 210 in the bowed, open plows facilitates an even application of the adhesive.

Figure 14:
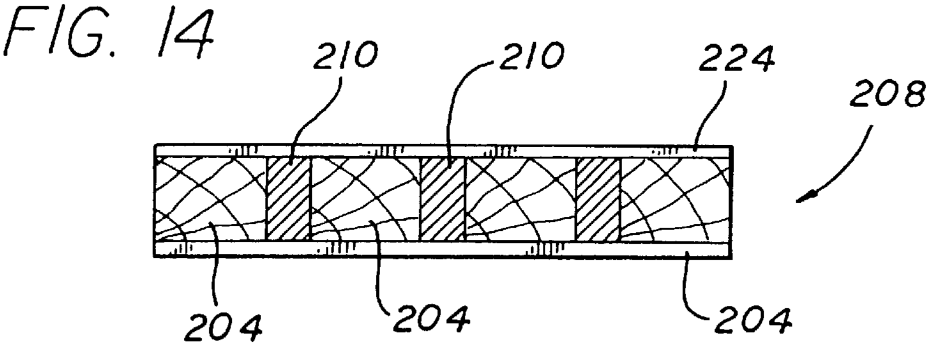
FIG. 14 is an end view of a composite panel including a second veneer layer.

For some applications, it is desirable to add a second veneer layer 224, on the side opposite the first veneer layer 202, as shown in FIG. 14, after the edge strips 210 have been inserted.

If the engineered moulding to be manufactured is to have a structure that does not require the first veneer layer 202, that layer can be formed of paper, plastic, or another disposable material, instead of wood (preferably about 1/16" thick), and can be removed by a machining, milling, grinding, abrading or sanding step after the edge strips 204 have been installed. If the moulding that is ultimately to be formed will include a wood veneer, or other veneer layer that is not structurally capable of holding the substrate 204 and not breaking during the bowing step described above, it may be desirable to use a paper veneer layer or a pealable plastic layer 202, which is then removed by sanding or pealing away and replaced by a wood veneer layer, applied to either side of the composite panel.

Figure 15:
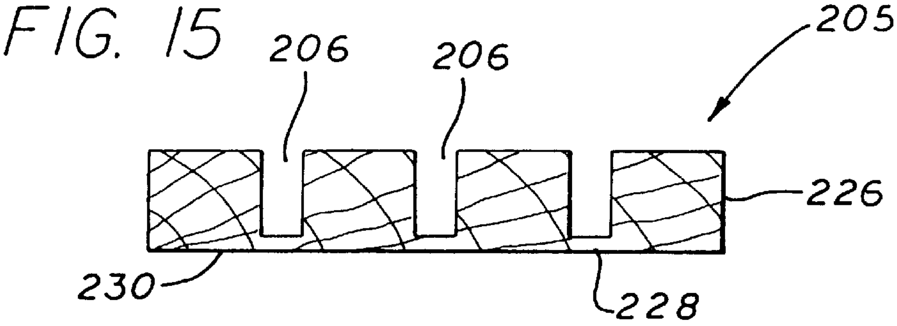
FIG. 15 is an end view of a receiving panel formed from a single piece of wood.

As an alternative to the above process, a receiving panel 205 can be formed from a single piece of wood 226, as shown in FIG. 15. The plows 206 are then formed by removing material from one major surface of the panel 200. The plows 206 can advantageously be formed as saw kerfs by a reengineered rip saw of the design described above, or can be formed by conventional wood working methods. The resulting veneer layer 228 is not a separate piece, but is the integral part of the single wood piece 226 that extends along the closed side 230 of the panel beneath the plows 206. If it is desired to remove the integrally formed wood veneer layer 228 after the edge strips 210 have been inserted, this removal is preferably accomplished by planing.

Once the composite panel has been formed by any of the processes described above, it is then cut lengthwise into parallel sections, by cutting through the edge strips 210. To do so, it is again advantageous to use the engineered rip saw, as explained above. Each linear section thus formed constitutes a separate engineered moulding. Additional shaping and profiling may be accomplished at the same time.

The materials used in this process are chosen in the manner described above. In most, but not all, situations, the preferred material for the substrates 204 is a composite material, most preferably, particle board, medium density fiberboard or oriented strand board, but other materials may be used as explained above.

Figure 16:
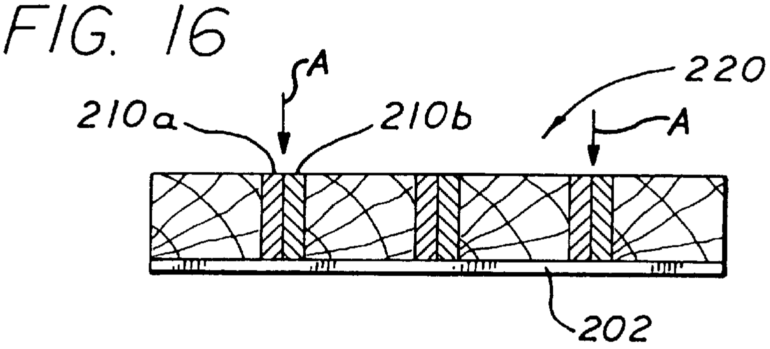
FIG. 16 is an end view of a composite panel in which each edge strip is formed by two abutting laminations.

As a variation on the above process, each edge strip can consist of two co-extensive abutting laminations 210A and 210B. These laminations 210A and 210B are adhered to the adjacent surfaces of the plows 206, but are freely separable and have no adhesive applied along the surfaces on which they abut each other, which are perpendicular to the major surfaces 220 and 222 of the panel, as shown in FIG. 16. The veneer layer 202 is then cut along the lines indicated by the arrows A so that each of the laminations 210A and 210B form an outer surfaces of engineered mouldings, which do not require any additional finishing. The laminations 210A and 210B may, for example, be a decorative plastic laminate that forms the finished edge of the moulding and the veneer layer 202 may also be a plastic or thermal fused Melamine laminate, such as Formica.

It will be appreciated that the above-described fabrication method will reduce considerably the amount of labor required in the fabrication of engineered moulding as the edge strips 210 can be made to close tolerances with respect to the plows 206, but still can be easily inserted. Moreover, damage to the work pieces during insertion of the edge strips 210 is avoided and adherence is facilitated by the tight fit obtained.

Although the invention has been described in detail with reference only to certain exemplary embodiments, those skilled in the art will appreciate that various modifications can be made without departing from the invention.

I claim:

1. A method for fabricating a composite panel comprising the steps of:

forming a receiving panel defining a plurality of spaced apart parallel plows extending longitudinally therealong and a veneer layer extending across the plows, whereby the receiving panel has an open surface along which the plows are exposed and an opposing surface from which the plows are not accessible;

bowing the receiving panel to form an arc about an axis parallel to the plows so as to enlarge and open the plows at one end thereof;

inserting strips in the plows while the receiving panel is bowed and applying an adhesive to an interface between the strips and the surfaces of the plows; and causing the receiving panel to return to an unbowed condition and thereby securing the strips within the plows.

2. The method of claim 1 further comprising the step of cutting the composite panel parallel to the strips to form a plurality of separate composite segments.

3. The steps of claim 1 wherein the composite panel is cut through the strips by passing it through a rip saw having a plurality of parallel blades.

4. The method of claim 1 wherein the receiving panel is formed of a single piece of wood that includes a continuous veneer layer extending across the plows and thus connecting the substrates.

5. The method of claim 1 wherein the composite panel is formed partially of wood and partially of a composite material.

6. The method of claim 1 further comprising the step of removing the veneer layer.

7. A method for fabricating a plurality of engineered mouldings comprising the step of:

forming a receiving panel defining a plurality of spaced-apart parallel plows extending longitudinally therealong and a veneer layer extending across the plows, whereby the receiving panel has an open surface along which the plows are exposed and an opposing surface from which said plows are not accessible;

bowing the receiving panel to form an arc about an axis parallel to the plows so as to enlarge and open the plows at one end thereof;

inserting edge strips in the plows while the receiving panel is bowed and applying an adhesive to an interface between the edge strips and the surfaces of the plows;

causing the receiving panel to return to an unbowed condition and thereby securing the edge strips within the plows, thus forming a composite panel; and cutting the composite panel through the edge strips to form a plurality of separated mouldings.

8. The method of claim 7 wherein the receiving panel is formed by securing a plurality of separately formed spaced-apart substrates to the veneer layer, whereby the plows are defined between adjacent substrates.

9. The method of claim 7 further comprising the step of removing the veneer layer.

10. The method of claim 9 wherein the veneer layer is paper.

11. The step of claim 7 further comprising the step of adhering a second veneer layer to the open surface of the receiving panel and to the edge strips.

12. The step of claim 7 wherein the composite panel is cut through the edge strips by passing it through a rip saw having a plurality of parallel blades.

13. The method of claim 7 wherein the receiving panel is formed of a single piece of wood that includes a continuous veneer layer extending across the plows and thus connecting the substrates.

14. The method of claim 13 comprising the further step of removing the veneer layer after inserting the edge strips and before cutting.

15. The method of claim 14 wherein the removal of the veneer layer is accomplished by sanding.

16. The method of claim 7 wherein:

the receiving panel is formed of a single piece of wood that includes a continuous veneer layer extending across the plows and thus connecting the substrates; and the method includes the further step of removing the veneer layer by planing.

17. The method of claim 7 wherein the edge strips are made of wood and the receiving panel is at least partly made of a composite material.

18. The method of claim 7 wherein the composite material is particle board, medium density fiber board, oriented strand board, laminated veneer lumber, plywood, cement board or rigid plastic foam.

19. The method of claim 7 wherein:

the receiving panel is formed by positioning strips of composite material positioned between the plows; and the edge strips are made of wood.

20. The method of claim 19 wherein the composite material is particle board, medium density fiber board, oriental strand board, laminated veneer lumber, plywood, cement board or rigid plastic foam.

21. The method of claim 7 wherein the receiving panel is bowed by passing it between two rollers that define a profile between them corresponding to the arc of the receiving panel.

22. The method of claim 21 whereby the receiving panel is carried between the rollers on a flexible belt.

23. The method of claim 7 wherein each edge strip is formed by two abutting laminations that are not adhered to each other but are adhered to the surfaces of the plow in which they are inserted.

24. A method for fabricating a plurality of engineered mouldings comprising the steps of:

forming a receiving panel by adhering a plurality of substrates to a veneer layer so as to define a series of parallel plows between the substrates, the substrates being made of a composite material and the veneer layer being made of wood, the receiving panel thereby formed having an open surface along which the plows are exposed and an opposing surface from which the plows are not accessible;

bowing the receiving panel to form an arc about an axis parallel to the plows so as to enlarge and open the plows by passing the receiving panel between two rollers configured to define the arc between them;

inserting edge strips made of wood in the plows while the receiving panel is bowed and applying an adhesive to an interface between the edge strips and the surfaces of the plows;

causing the receiving panel to return to an unbowed condition and thereby securing the edge strips within the plows, thus forming a composite panel; and cutting the composite panel through the edge strips to form a plurality of separate mouldings.

25. A method of claim 24 further comprising the step of adding a second veneer layer made of wood to the open surface of the receiving panel and the edge strips before cutting the composite panel.

26. The method of claim 24 wherein the composite material is particle board, medium density fiber board, oriental strand board, laminated veneer lumber, plywood, cement board or rigid plastic foam.

27. The step of claim 24 wherein the composite panel is cut through the edge strips by passing it through a rip saw having a plurality of parallel blades.

28. A method for fabricating a plurality of engineered mouldings comprising the steps of:

forming a receiving panel by adhering a plurality of substrates to a veneer layer so as to define a series of parallel plows between the substrates, the substrates being made of a composite material and the veneer layer being made of wood, the receiving panel thereby formed having an open surface along which the plows are exposed and an opposing surface from which the plows are not accessible;

bowing the receiving panel to form an arc about an axis parallel to the plows so as to enlarge and open the plows by passing the receiving panel between two rollers configured to define the arc between them;

inserting edge strips formed by two abutting laminations that are not adhered to each other in the plows while the receiving panel is bowed and applying an adhesive to interfaces between the laminations and the surfaces of the plows, causing the composite panel to return to an unbowed condition and thereby securing the laminations within the plows; and cutting the composite panel along the edge strips so as to separate abutting laminations.

29. A method of claim 28 further comprising the step of adding a second veneer layer made of wood to the open surface of the receiving panel and the edge strips before cutting the composite panel.

* * * * *

UNITED STATES PATENT AND TRADEMARK OFFICE
CERTIFICATE OF CORRECTION

PATENT NO. : 5,944,928

DATED : August 31, 1999

INVENTOR(S) : Marc A. Seidner

It is certified that error appears in the above-identified patent and that said Letters Patent is hereby corrected as shown below:

Col. 18, line 27, delete "oriental" and insert therefor -- oriented --.

Signed and Sealed this

Sixteenth Day of May, 2000

*Attest:*

Q. TODD DICKINSON

*Attesting Officer*

*Director of Patents and Trademarks*